United States Patent
Cong

(10) Patent No.: US 10,457,825 B2
(45) Date of Patent: *Oct. 29, 2019

(54) UV CURABLE INKJET INK COMPOSITIONS

(71) Applicant: Electronics for Imaging, Inc., Fremont, CA (US)

(72) Inventor: Lianhui Cong, Concord, NH (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,588

(22) Filed: Aug. 16, 2016

(65) Prior Publication Data

US 2018/0057703 A1 Mar. 1, 2018

Related U.S. Application Data

(60) Provisional application No. 62/206,161, filed on Aug. 17, 2015.

(51) Int. Cl.
| | |
|---|---|
| *C08F 2/48* | (2006.01) |
| *C08F 2/50* | (2006.01) |
| *C08G 61/04* | (2006.01) |
| *C09D 11/38* | (2014.01) |
| *C09D 11/101* | (2014.01) |
| *C09D 11/322* | (2014.01) |
| *C08G 18/67* | (2006.01) |

(52) U.S. Cl.
CPC ............ *C09D 11/38* (2013.01); *C08G 18/672* (2013.01); *C09D 11/101* (2013.01); *C09D 11/322* (2013.01); *C08F 2/48* (2013.01)

(58) Field of Classification Search
CPC ..... C09D 11/101; C09D 11/38; C09D 11/322; C08F 2/48; C08G 18/672

USPC .......................... 522/120, 114, 113, 1; 520/1
See application file for complete search history.

(56) References Cited

U.S. PATENT DOCUMENTS

| | | | |
|---|---|---|---|
| 8,889,232 B2 | 11/2014 | Cong | |
| 9,260,616 B2 * | 2/2016 | Cong | ............... B41J 2/2107 |
| 2008/0090931 A1 * | 4/2008 | Nagvekar | ............ C09D 4/00 |
| | | | 522/114 |
| 2009/0099277 A1 | 4/2009 | Nagvekar | |
| 2011/0045199 A1 * | 2/2011 | Cong | ................. C08F 2/48 |
| | | | 427/487 |
| 2012/0129972 A1 | 5/2012 | Hall et al. | |
| 2013/0269558 A1 | 10/2013 | Vanmaele et al. | |
| 2013/0276653 A1 | 10/2013 | Daems et al. | |
| 2013/0319273 A1 * | 12/2013 | Vanmaele | ............ B41C 1/003 |
| | | | 101/401.1 |
| 2017/0342281 A1 * | 11/2017 | Samuel | ............ C09D 11/101 |

FOREIGN PATENT DOCUMENTS

| | | |
|---|---|---|
| EP | 1697471 A1 | 9/2006 |
| EP | 2399966 A1 | 12/2011 |
| EP | 2466380 A1 | 6/2012 |
| WO | 2011160954 A1 | 12/2011 |
| WO | 2014051702 A1 | 4/2014 |

* cited by examiner

*Primary Examiner* — Jessica Whiteley
(74) *Attorney, Agent, or Firm* — Perkins Coie LLP

(57) ABSTRACT

A UV curable inkjet ink composition includes a monofunctional urethane acrylate component consisting of 5-50% by weight of the ink composition, the monofunctional urethane acrylate component comprising either of a monomer and an oligomer; a monomer component consisting of 10-80% by weight of ink composition; a photoinitiator component consisting of 1-15% by weight of ink composition; and an oligomer component, consisting of no more than 20% by weight of the ink composition, in addition to the monofunctional urethane acrylate component if the monofunctional urethane acrylate component is an oligomer.

12 Claims, 4 Drawing Sheets

UV CURABLE INKJET INK COMPOSITIONS

CROSS REFERENCE TO RELATED APPLICATIONS

Figure 1:
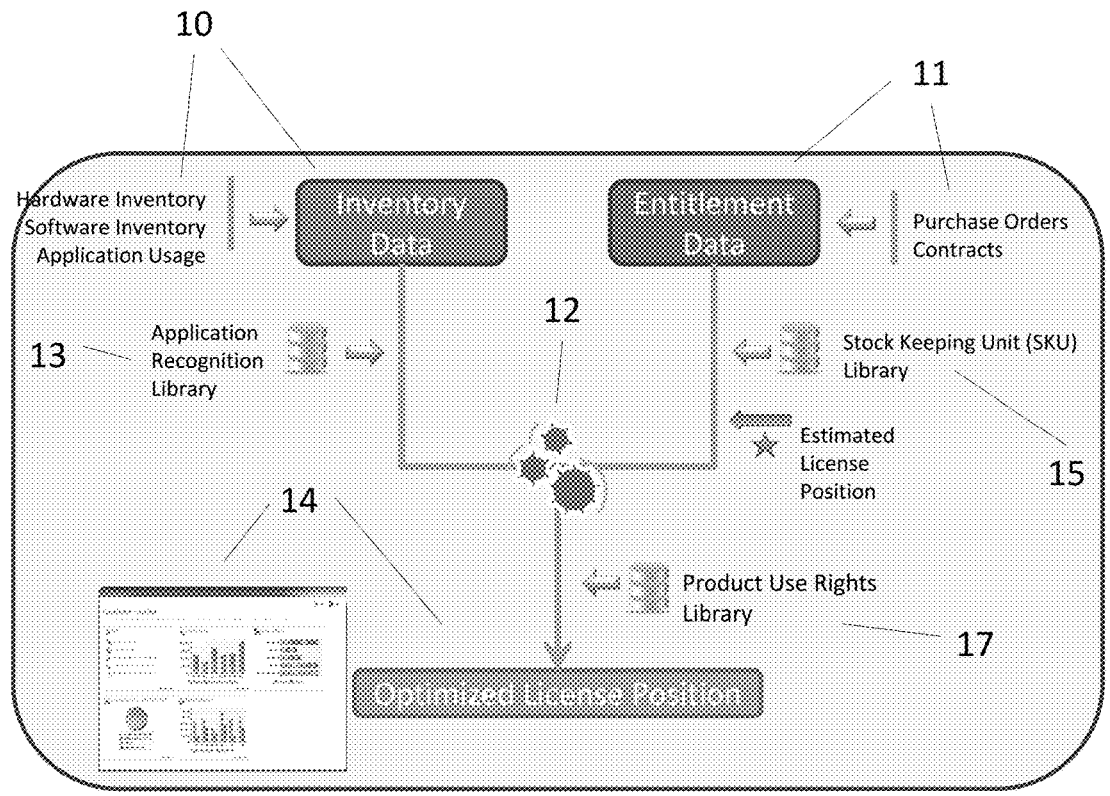
Figure 2:
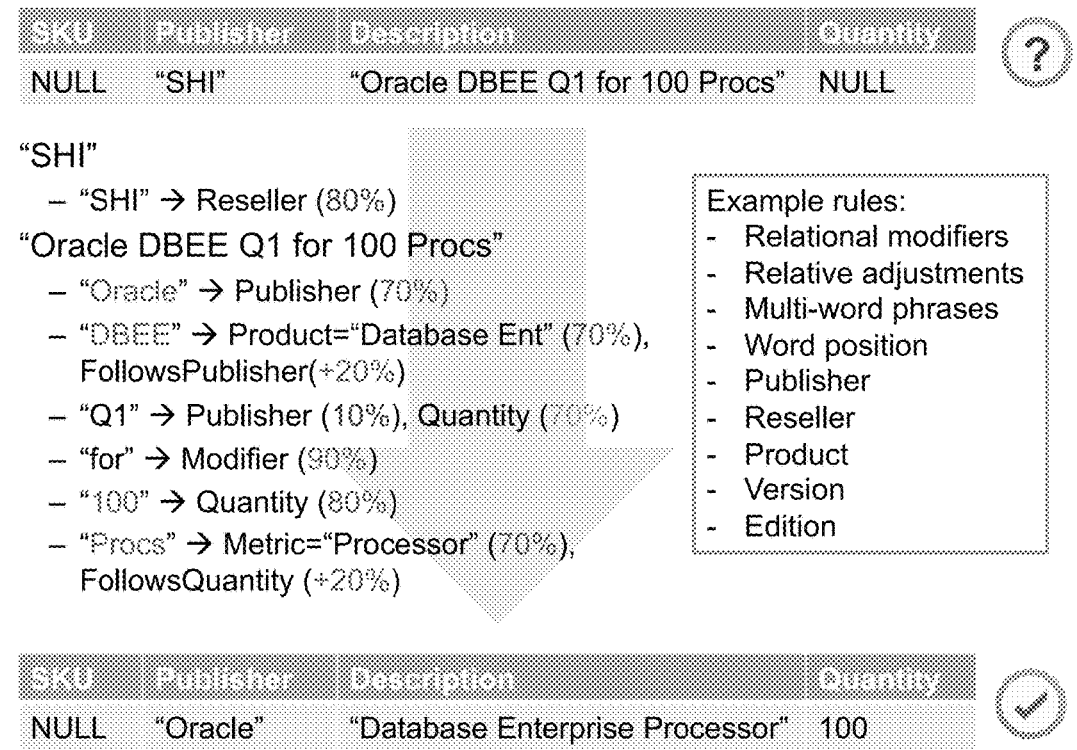
Figure 3:
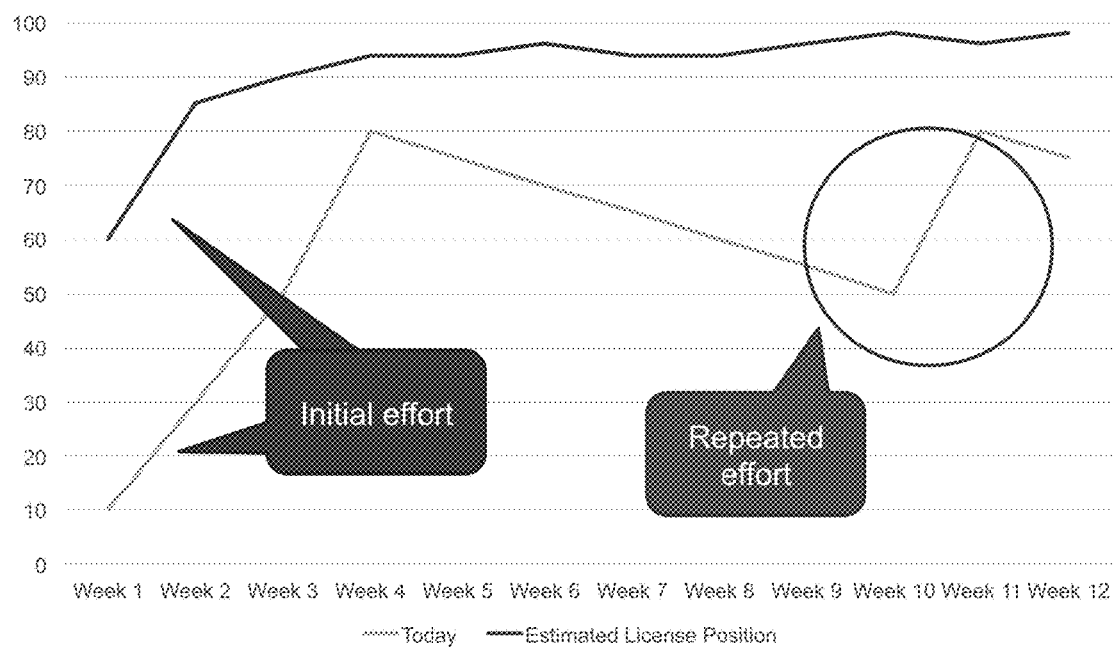
Figure 4:
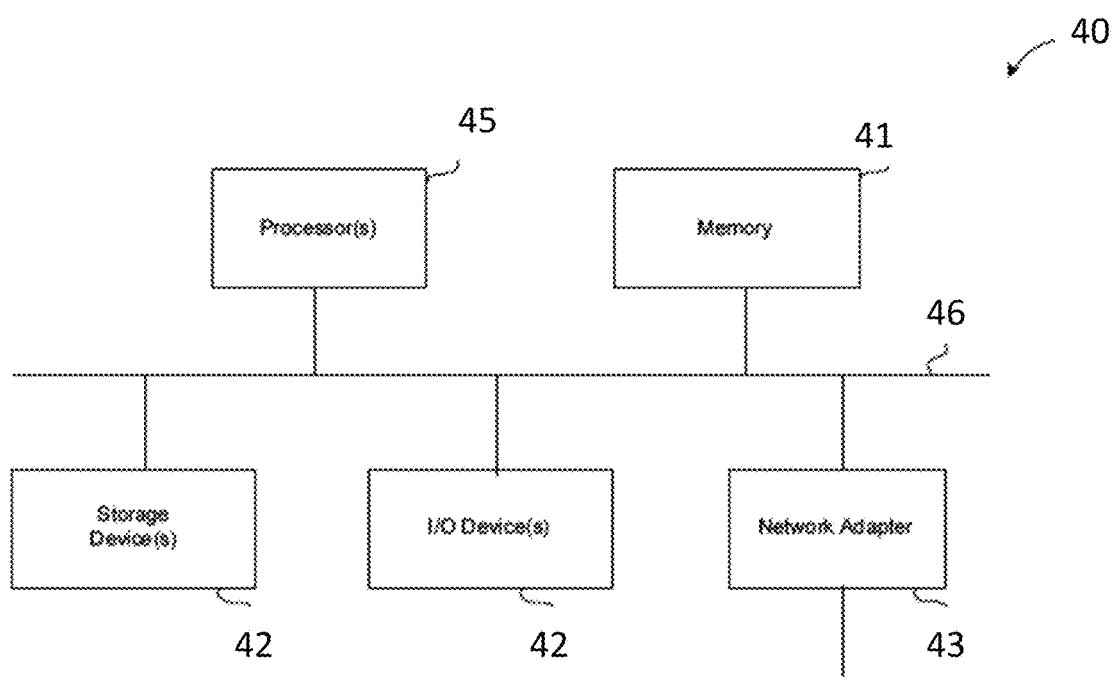

This application claims priority to U.S. provisional patent application Ser. No. 62/206,161, filed Aug. 17, 2015, which is incorporated herein in its entirety by this reference thereto.

FIELD

The invention relates to ink jet printing. More particularly, the invention relates to UV curable inkjet ink compositions.

BACKGROUND

UV curable inks for inkjet printing have been widely used in the past ten years. See, for example, Radiation Curable ink Compositions (U.S. Pat. No. 8,889,232), A radiation curable ink composition and Application Thereof (EP 1697471), and Radiation Curable and Jettable Ink Composition (US 2009/0099277).

UV curable inkjet inks have been considered as green or environmentally friendly inks. They are unlike traditional solvent based inks, in which a high level of organic hydrocarbon solvents are used, where the evaporation of such solvents in the drying process potentially creates both environmental and health hazards. Rather, UV curable inkjet inks are solvent-free formulations and near-instantaneous cure without generating any hazardous materials. They also have excellent ink performance on a wide range of substrates. However, with the increased demand for high performance inks, especially for the ever expanding substrate list, UV curable inkjet inks present substantial challenges in achieving good adhesion on some popular substrates, such as Acrylic, Coproplast, polystyrene, and polycarbonates, etc. which have been widely used in other printing industries, i.e. screen and offset printing industries.

SUMMARY

UV curable inkjet inks are generally composed of monomeric and oligomeric materials, pigments, initiators, and additives, and optionally, a small amount of solvent. Such UV curable inkjet inks are printed on numerous substrates, both rigid and flexible. The ink performance, e.g. adhesion, scratch and rub resistance, flexibility, hardness, etc. are highly dependent on the ink compositions, especially the properties of the monomeric and oligomeric materials used in the ink compositions.

Embodiments of the invention concern UV curable ink compositions that offer good adhesion on a broad range of substrates including Acrylic and polypropylene substrates, i.e. Coroplast, and fast cure properties to meet increasing demand for higher output from inkjet printers.

Embodiments of the invention provide a UV curable inkjet ink with good adhesion on a broad of range of substrates, including acrylic and Polypropylene (Coroplast), which current UV curable inkjet inks have no or poor adhesion.

Embodiments of the invention provide the high performance UV curable inkjet inks with fast cure property and excellent flexibility.

Embodiments of the invention offer a UV curable inkjet ink with good adhesion to a broad range of media including Acrylic and polypropylene, i.e. Coroplast, where previous inks have no or poor adhesion.

Embodiments of the invention improve the performance of inks by enhancing adhesion properties.

An embodiment of the invention provides a UV curable inkjet ink composition that includes a monofunctional urethane acrylate component consisting of 5-50% by weight of the ink composition, the monofunctional urethane acrylate component comprising either of a monomer and an oligomer; a monomer component consisting of 10-80% by weight of ink composition; a photoinitiator component consisting of 1-15% by weight of ink composition; and an oligomer component, consisting of no more than 20% by weight of the ink composition, in addition to the monofunctional urethane acrylate component if the monofunctional urethane acrylate component is an oligomer.

DESCRIPTION

UV curable inkjet inks are generally composed of monomeric and oligomeric materials, pigments, initiators, and additives, and optionally, a small amount of solvent. Such UV curable inkjet inks are printed on numerous substrates, both rigid and flexible. The ink performance, e.g. adhesion, scratch and rub resistance, flexibility, hardness, etc. are highly dependent on the ink compositions, especially the properties of the monomeric and oligomeric materials used in the ink compositions.

Embodiments of the invention concern UV curable ink compositions that offer good adhesion on a broad range of substrates including Acrylic and polypropylene substrates, i.e. Coroplast, and fast cure properties to meet increasing demand for higher output from inkjet printers.

Embodiments of the invention provide a UV curable inkjet ink with good adhesion on a broad of range of substrates, including acrylic and Polypropylene (Coroplast), which current UV curable inkjet inks have no or poor adhesion.

Embodiments of the invention provide the high performance UV curable inkjet inks with fast cure property and excellent flexibility.

Embodiments of the invention offer a UV curable inkjet ink with good adhesion to a broad range of media including Acrylic and polypropylene, i.e. Coroplast, where previous inks have no or poor adhesion.

Embodiments of the invention improve the performance of inks by enhancing adhesion properties.

An embodiment of the invention provides a UV curable inkjet ink composition that includes a monofunctional urethane acrylate component consisting of 5-50% by weight of the ink composition, the monofunctional urethane acrylate component comprising either of a monomer and an oligomer; a monomer component consisting of 10-80% by weight of ink composition; a photoinitiator component consisting of 1-15% by weight of ink composition; and an oligomer component, consisting of no more than 20% by weight of the ink composition, in addition to the monofunctional urethane acrylate component if the monofunctional urethane acrylate component is an oligomer.

Thus, embodiments of the invention provide high performance and regulatory friendly UV curable inkjet inks. A combination of monofunctional urethane acrylates (monomer or oligomer), i.e. Genomer 1122, with selective other monomers and/or other oligomers, i.e. CN991, Ebecryl 8402, CN9900, etc., offer a high performance ink with excellent adhesion to Acrylic and polypropylene, i.e. Coroplast, and other common substrates used for inkjet printing.

Embodiments of the invention provide a fast cure and flexible ink.

Embodiments of the invention provide an ink with jettable viscosity for inkjet printers, not greater than 30 cps at 45 Celsius, preferred 10-20 cps at 45 Celsius.

The ink compositions can be printed on an ink jet printer. Any conventional ink jet printer is acceptable In one embodiment, the ink jet printer includes a component for radiation curing of the ink. In another embodiment, the radiation curing component is a separate assembly. Non limiting examples of suitable radiation sources for UV curing include high-pressure or low-pressure mercury vapor lamps, with or without doping, or electron beam sources. Their arrangement is known in principle and may be adapted to the circumstances of the substrate for printing and the process parameters.

In one embodiment shown in Table 1 below, the inks have good adhesion on a broad of range of substrates including Acrylics and polypropylene, i.e. Coroplast. In this embodiment, a UV curable ink composition comprises at least a monomer component, a photoinitiator component, an additive component, and an oligomer component.

Examples of monofunctional urethane acrylates include, but are not limited to 2-[[(butylamino)carbonyl]oxy]ethyl acrylate (Genomer 1122 or Photomer 4184), Genomer 4188 from RAHN, etc. The range of the monofunctional urethane acrylates is 5-50% by weight of the ink composition, preferred 5-35%, and more preferred 10-35%.

A monomer is selected from the group consisting of vinyl caprolactam, isobornyl acrylate, 2-phenoxyethyl acrylate, cyclic trimethylol-propane formal acrylate, 4-tert-butylcyclohexyl acetate, and combinations of these materials. The range of the monomer is 10-80% by weight of ink composition, preferred 10-60%, more preferred 30-60%. In one embodiment, the inks comprise other monomers, with no more than 30% by weight of ink composition.

In one embodiment, the inks comprise an oligomer component with no more than 20% by weight of ink composition. The monofunctional urethane acrylate is not counted in this percentage if it is an oligomer. Examples of suitable oligomers include, but are not limited to, those under the designations of CN820, CN152, CN146, CN991, CN929, CN966, CN981, CN9006, CN9007, CN992, CN994, CN997, CN978, CN1963, CN3200, CN2279, CN2270, etc. from Sartomer USA, LLC, and those from Allnex (Former Cytec Surface Specialty, Inc.) under the designations of EBECRYL 8402, EBECRYL 1290, EBECRYL 3701, EBECRYL 3708, EBECRYL 3200, EBECRYL 3600, etc.

The following percentages also apply in embodiments of the invention:

Photoinititors; 1-15%.
Additives: 0.1-5%.
Pigments: 0-20% (0% is for clear ink or coating).

Photoinitiator Component

The ink compositions comprise a photoinitiator component. In the radiation curing process, the photoinitiator component initiates the curing in response to incident radiation. The amount of a photoinitiator component in the ink compositions is 1-15% by weight, and preferably, 5-15% by weight. The selection of the type of the photoinitiator component in the ink compositions is generally dependent on the wavelength of curing radiation and the colorant employed in the ink compositions. It is preferred that the peak absorption wavelengths of selected photoinitiator vary with the range of wavelength of curing radiation to effectively use radiation energy, especially using ultraviolet light as radiation.

Examples of suitable photoinitiators include, but are not limited to, 1-hydroxycyclohexylphenyl ketone, 4-isopropylphenyl-2-hydroxy-2-methyl propan-1-one, 1-[4-(2-hydroxyethoxy)-phenyl]-2-hydroxy-2-methyl-1-propan-1-one, 2,2-dimethyl-2-hydroxy-acetophenone, 2,2-dimethoxy-2 phenylacetophenone, 2-hydroxy-2-methylpropionphenone, Diphenyl (2,4,6-trimethylbenzoyl) phosphine oxide, bis(2,6 dimethoxy-benzoyl)-2,4,6 trimethyl phenyl phosphine oxide, 2-methyl-1-1 [4-(methylthio) phenyl]-2-morpholino-propan 1-one, 3,6-bis(2-methyl-2-morpholino-propionyl)-9-n-octylcarbazole, 2-benzyl-2-(dimethylamino)-1-(4-morpholinyl)phenyl)-1-butanone, benzophenone, 2,4,6 trimethylbenzophenone, isopropyl thioxanthone. Suitable blends of photoinitiators commercially available include, but are not limited to, those under the designations of Darocur 4265, Irgacure 2022, Irgacure 2100 from Ciba® Specialty Chemicals; and Esacure KT37, Esacure KT55, Esacure KTOO46 from Lamberti®).

The photoinitiator component can further comprise a coinitiator. The amount of co-initiator component is 0-15% by weight of the ink compositions, preferably 0-10% by weight of the ink compositions, more preferably 2-7% by weight of ink compositions. The co-initiator component is used to activate photoinitiators to initiate polymerization or is used to improve the surface curing of ink by mitigating oxygen inhibition to free radicals generated by photoinitiators. Examples of suitable co-initiators include, but are not limited to, those under the designations of CN386, CN384, and CN383 from Sartomer® and Ebecryl 7100 from Cytec® Surface Specialty.

Additive Component

In one embodiment of the invention, the ink compositions further comprise an additive component. Various additives can be included in the ink compositions, including a surfactant, a leveling additive, a stabilizer, etc.

A surfactant is used to reduce the surface tension of the ink compositions to improve wetting property of the inks on substrates. The amount of surfactant in the ink compositions is 0.01-2% by weight, and preferably 0.05-0.5% by weight. It is preferred that the surfactant comprises at least one polysiloxane acrylate, also known as a silicone acrylate, which participates in the radiation curing process to be part of cured ink. Examples of a suitable surfactant include, but are not limited to, those under the designations of Tegorad 2200N, Tegorad 2100, and Tegorad 2300 from Goldschmidt® Chemical Corp., and BYK 377, BYK 3510, BYK 307, and BYK 330 from BYK Chemie®.

A leveling additive is used to improve the following property of ink to produce a more uniform surface of ink film. The amount of leveling agent in the ink compositions is 0.1-2% by weight. Examples of suitable leveling agent include, but are not limited to, those under the designation of BYK 361N, BYK 353, and BYK 354 etc. from BYK Chemie®.

A stabilizer is used to improve shelf life and photolytic stability of ink compositions. Stabilizers in the ink compositions can include an ultraviolet light stabilizer, a free radical=scavenger stabilizer, etc. Examples of ultraviolet light stabilizers include ultraviolet absorber stabilizer and hindered amine light stabilizer. These stabilizers are used to improve the outdoor durability and weatherability of cured ink. Commercially available ultraviolet light stabilizers include, but are not limited to, those under the designation of Tinuvin 460, Tinuvin 479, Tinuvin171, Tinuvin 928, Tinuvin123, and Tinuvin 292 from Ciba® Specialty Chemicals, etc. They can be present in the ink compositions in amounts of 0.1%-1.5% by weight, and more specifically 0.1%-1% by weight.

A free radical scavenger stabilizer is used to improve the stability of ink against heat. Examples of a free radical scavenger include, but are not limited to, hydroquinone, 4-methoxyphenol, hindered phenol, etc. The amount of free radial scavenger stabilizer can be present in ink compositions in 0.05-1% by weight, and more specifically 0.1-0.75% by weight. A small amount is preferably used in the ink compositions to minimize their interference with the radiation curing process.

Colorant Component

The ink compositions further comprise a colorant component if color is desired. The colorant can be pigment, dyes, or a combination of pigment and/or dyes. The amount of colorant component in the ink compositions is in the range of 0-20% by, more preferably 0-8% by weight. A clear coating has 0% colorant.

Examples of suitable Pigments include, but are not limited to, those under the designation of Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60; Pigment Brown 5, Pigment Brown 23, and Pigment Brown 25; Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 120, Pigment Yellow 128, Pigment Yellow 129, Pigment Yellow 138, Pigment Yellow 139, Pigment Yellow 150, Pigment Yellow 154, Pigment Yellow 156, and Pigment Yellow 175; Pigment Green 1, Pigment Green 7, Pigment Green 10, and Pigment Green 36; Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61; Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224; Pigment Violet 19, Pigment Violet 23, Pigment Violet 37, Pigment Violet 32, Pigment Violet 42; and Pigment Black 6 or 7 (The Color Index, Vols. 1-8, by the Society of Dyers and Colourists, Yorkshire, England), Black PB 2 and 5; carbon black; titanium dioxide (including rutile and anatase); zinc sulfide, and the like or a mixture thereof.

If pigment is used in the ink compositions, preferably, the pigment is pre-dispersed prior to incorporation, generally into one or more of the monomer and/or oligomer components used in the ink compositions. Dispersion agents generally are used to improve the stability of dispersion by reducing or avoiding the possibility of pigment particle settling or agglomerating. Examples of suitable dispersion agents include, but are not limited to, those under the designations of Solsperse 32000 from Lubrizol® Advanced Materials, and DisperBYK 111 and DisperBYK180 from Byk Chemie®.

The pigment in the dispersion can be 20-80% by weight. Other additives such as stabilizers, flowing additive, etc. can be incorporated during the dispersion process to improve the stability of dispersion.

Examples

The ink samples were prepared at 600×360 dpi prints from the EFI Vutek GS3250 LX printer with 30-35 pl drop size. The inks were cured with a 7 w Phoseon LED lamp, eight passes at the speed of 62 inch/s. The prints are tack free on the surface.

The adhesion measurement (see Table 2 below) was based on ASTM D 3359. The test was conducted by cutting a cross-hatch pattern on the ink sample and applies a suitable tape, e.g. Permacel 99 adhesion test tape from Permacel® over the crosshatch area. The tape was rubbed firmly to remove any trapped air bubbles to ensure full contact, and the tape was then rapidly pulled off close to an angle of 180. The crosshatch area was evaluated based on ASTM D 3359 method B.

The elongation was measured using a tensile tester from COM-TEN, Model: 95 Series. The ink sample was cut into strips with one-inch width, and placed in the two clamps, which was set two inches apart. The speed crosshead is twelve inches/min, and the test was stopped when the sample broke. The elongation was measured at the point when the ink film starts to crack.

Surface scratch resistance evaluation: 0-5 rating. 5 is best indicating no ink is scratched off from the substrate by finger nail or nickel.

Surface Tack evaluation: 0-5 rating. 5 is best indicating no tack feel by pressing the surface with fingers or hands.

TABLE 1

|  | Alternate name | Cyan % | Magenta % |
| --- | --- | --- | --- |
| SR339 | PEA | 33.15 | 27.45 |
| SR506 | IBOA | 16.00 | 19.00 |
| Ebecryl | 8402 Urethane Acrylate | 8.00 |  |
| Genocure 1122 | Urethane Acrylate | 18.00 | 20.00 |
| V-Cap | N-Vinyl Caprolactam | 9.50 | 9.50 |
| SR9003 | PONPGDA | 3.10 | 10.50 |
| BYK-361N | Polyacrylate | 0.50 | 0.50 |
| BYK-377 | Polyester Modified Polydimethyl Siloxane | 0.050 | 0.050 |
| Genorad 16 | Stabilizer |  | 0.50 |
| Irgastab UV22 | Stabilizer | 1.00 |  |
| Genocure TPO | Acylphosphine Oxide, MAPO | 9.00 | 9.00 |
| Cyan | Cyan Pigment | 1.70 |  |
| Magenta | Magenta Pigment |  | 3.50 |
| Total |  | 100.00 | 100.00 |
| Viscosity, cps @ 45 C. |  | 12.5 | 11.9 |
| Surface Tack |  | 5 | 5 |
| Scratch Resistance |  | 5 | 5 |
| Flexibility |  | 170% | 150% |

TABLE 2

| Adhesion Evaluation | Cyan Ink | Magenta Ink |
| --- | --- | --- |
| PETG | 5 | 5 |
| Lexan | 5 | 5 |
| Di-Bond-White | 5 | 5 |
| Di-Bond Butler-Metal brush side | 5 | 5 |
| White Styrene 0.01" | 5 | 5 |
| Sintra-White | 4 | 5 |
| Gator Board | 5 | 5 |
| Polypropylene (Coroplast) | 5 | 5 |
| Polyester (Melinex) | 5 | 5 |
| Lintec | 5 | 5 |

TABLE 2-continued

| Adhesion Evaluation | Cyan Ink | Magenta Ink |
|---|---|---|
| Acrylic (Clear) | 5 | 5 |
| White Styrene 0.02" | 4 | 5 |
| White Styrene 0.03" | 4 | 5 |
| White Styrene 0.02" (roll) | 5 | 5 |

Another formulation example is shown in Table 3 below.

TABLE 3

| | Alternative Name | Cyan % | Magenta % | Yellow % | Black % |
|---|---|---|---|---|---|
| SR531 | CTFA | 15.15 | 22.45 | 22.70 | 16.00 |
| SR506 | IBOA | 24.50 | 23.50 | 22.00 | 22.90 |
| CN9900 | Urethane Acrylate | 4.00 | | | 4.00 |
| Genocure 1122 | Urethane Acrylate | 30.00 | 19.00 | 20.00 | 24.00 |
| V-Cap | N-Vinyl Caprolactam | 9.50 | 9.50 | 9.50 | 9.50 |
| SR9003 | PONPGDA | 3.10 | 10.50 | 9.00 | 5.10 |
| BYK-361N | Polyacrylate | 0.50 | 0.50 | 0.50 | 0.50 |
| BYK-377 | Polyester Modified Polydimethyl Siloxane | 0.050 | 0.050 | 0.050 | 0.050 |
| IN-515 | Stabilizer | | | | 0.80 |
| Genorad 16 | Stabilizer | | 0.50 | 0.50 | |
| Irgastab UV22 | Stabilizer | 1.00 | | | |
| LED02 | Thiol Additive | 1.00 | 1.00 | 1.00 | 1.00 |
| Solsperse39000 | Dispersive Additive | 0.50 | | 0.50 | 0.50 |
| BYK9150 | Dispersive Additive | | 0.50 | | |
| Genocure TPO | Acylphosphine Oxide, MAPO | 9.00 | 9.00 | 10.00 | 12.00 |
| Genocure DETX | Diethyl Thioxanthones | | | 1.25 | 1.75 |
| Cyan | Cyan Pigment | 1.70 | | | |
| Magenta | Magenta Pigment | | 3.50 | | |
| Yellow | Yellow Pigment | | | 3.00 | |
| Black | Black Pigment | | | | 1.90 |
| | Total | 100.00 | 100.00 | 100.00 | 100.00 |
| | Viscosity, cps @ 45 C. | 12.2 | 12.0 | 11.9 | 12.2 |
| | Surface Tack | 5 | 5 | 5 | 5 |
| | Scratch Resistance | 5 | 5 | 5 | 5 |
| | Flexibility | 150 | 145 | 150 | 140 |

A further formulation example is shown in Table 4 below.

TABLE 4

| | Alternate name | Cyan % | Magenta % |
|---|---|---|---|
| SR339 | PEA | 22.1 | 25.45 |
| SR217 | TBCHA | 19 | 16 |
| SR238B | HDDA | 7 | 7 |
| CN991 | Urethane Acrylate | 9 | |
| Genocure 1122 | Urethane Acrylate | 18.00 | 18 |
| V-Cap | N-Vinyl Caprolactam | 9.50 | 9.50 |
| SR9003 | PONPGDA | 3.10 | 10.50 |
| BYK-361N | Polyacrylate | 0.50 | 0.50 |
| BYK-377 | Polyester Modified Polydimethyl Siloxane | 0.050 | 0.050 |
| Genorad 16 | Stabilizer 0.50 | | |
| Irgastab UV22 | Stabilizer | | 1.00 |
| Genocure TPO | Acylphosphine Oxide, MAPO | 9.00 | 9.00 |
| Cyan | Cyan Pigment | 1.70 | |
| Magenta | Magenta Pigment | | 3.50 |
| | Total | 100.00 | 100.00 |
| | Viscosity, cps @ 45 C. | 11.5 | 11.5 |
| | Surface Tack | 5 | 5 |
| | Scratch Resistance | 5 | 5 |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A UV curable inkjet ink composition, comprising:
    a monofunctional urethane acrylate component constituting 12-35% by weight of the UV curable inkjet ink composition, said monofunctional urethane acrylate component comprising either of a monomer and an oligomer;
    an additional monomer component constituting 10-80% by weight of the UV curable inkjet ink composition, the 10-80% by weight of the additional monomer component is in addition to the 12-35% by weight of the monofunctional urethane acrylate component when the monofunctional urethane acrylate component is a monomer;
    a photoinitiator component constituting 1-15% by weight of the UV curable inkjet ink composition; and
    an additional oligomer component constituting more than 0% but no more than 20% by weight of the UV curable inkjet ink composition, the no more than 20% by weight of the additional oligomer component is in addition to the 12-35% by weight of the monofunctional urethane acrylate component when the monofunctional urethane acrylate component is an oligomer.

2. The UV curable inkjet ink composition of claim 1, wherein said monofunctional urethane acrylate component is 2-[[(butylamino)carbonyl]oxy]ethyl acrylate.

3. The UV curable inkjet ink composition of claim 1, wherein the additional monomer component is selected from the group consisting of vinyl caprolactam, isobornyl acrylate, 2-phenoxyethyl acrylate, cyclic trimethylol-propane formal acrylate, 4-tert-butylcyclohexyl acetate, and combinations of these materials.

4. The UV curable inkjet ink composition of claim 1, wherein the additional monomer component constitutes 30-60% by weight of the UV curable inkjet ink composition.

5. The UV curable inkjet ink composition of claim 1, wherein the additional monomer component constitutes 10-30% by weight of the UV curable inkjet ink composition.

6. The UV curable inkjet ink composition of claim 1, further comprising:
    a pigment component.

7. The UV curable inkjet ink composition of claim 6, wherein the pigment component constitutes up to 20% by weight of the UV curable inkjet ink composition.

8. The UV curable inkjet ink composition of claim 1, further comprising:
   an additive component.

9. The UV curable inkjet ink composition of claim 8, wherein the additive component constitutes 0.1-5% by weight of the UV curable inkjet ink composition.

10. The UV curable inkjet ink composition of claim 1, wherein the UV curable inkjet ink composition has a jettable viscosity for inkjet printers not greater than 30 cps at 45 Celsius.

11. The UV curable inkjet ink composition of claim 1, wherein the UV curable inkjet ink composition has a jettable viscosity for inkjet printers of 10-20 cps at 45 Celsius.

12. A method of ink jet printing comprising:
   jetting from an ink jet printer an ink composition onto a substrate, the ink composition comprising:
      a monofunctional urethane acrylate component constituting 12-35% by weight of the ink composition, said monofunctional urethane acrylate component comprising either of a monomer and an oligomer;
      an additional monomer component constituting 10-80% by weight of the ink, the 10-80% by weight of the additional monomer component is in addition to the 12-35% by weight of the monofunctional urethane acrylate component when the monofunctional urethane acrylate component is a monomer;
      a photoinitiator component constituting 1-15% by weight of the ink composition; and
      an additional oligomer component constituting more than 0% but no more than 20% by weight of the ink composition, the no more than 20% by weight of the additional oligomer component is in addition to the 12-35% by weight of the monofunctional urethane acrylate component when the monofunctional urethane acrylate component is an oligomer.

* * * * *